United States Patent [19]
Baba

[11] Patent Number: 5,119,210
[45] Date of Patent: Jun. 2, 1992

[54] FACSIMILE MACHINE HAVING ERROR CORRECTION MODE

[75] Inventor: Keizo Baba, Atsugi, Japan

[73] Assignee: Ricoh Company, Ltd., Tokyo, Japan

[21] Appl. No.: 385,110

[22] Filed: Jul. 26, 1989

[30] Foreign Application Priority Data

Aug. 18, 1988 [JP] Japan ................... 63-203788

[51] Int. Cl.⁵ .................................. H04N 1/00
[52] U.S. Cl. ......................... 358/405; 358/404; 358/444
[58] Field of Search .......... 358/405, 404, 403, 401, 358/400, 434, 443, 78, 444; 379/100

[56] References Cited

U.S. PATENT DOCUMENTS

| | | | |
|---|---|---|---|
| 4,743,975 | 5/1988 | Ijuin | 358/404 |
| 4,774,590 | 9/1988 | Haganuma et al. | 358/444 |
| 4,841,373 | 6/1989 | Asami et al. | 358/404 |
| 4,975,783 | 12/1990 | Takaoka | 358/404 |

FOREIGN PATENT DOCUMENTS 3419448 11/1984 Fed. Rep. of Germany.

| | | | |
|---|---|---|---|
| 57-148467 | 9/1982 | Japan | 358/404 |
| 57-173255 | 10/1982 | Japan | 358/404 |
| 59-111468 | 6/1984 | Japan | |
| 60-93877 | 5/1985 | Japan | 358/404 |
| 60-183874 | 9/1985 | Japan | 358/404 |

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

A facsimile machine has an error correction mode (ECM) in conformance with CCITT recommendations. The facsimile machine is provided with a memory which has a memory capacity of at least two blocks, for example. In the ECM, a first page is stored in the memory and then a second page is stored in the memory while simultaneously reading out the first page from the memory and recording an image of the first page. Even when the storage of the second page ends before the recording of the first page ends, a storage of a third page in the memory is enabled if an available empty memory region in the memory amounts to one or more blocks, for example.

7 Claims, 7 Drawing Sheets

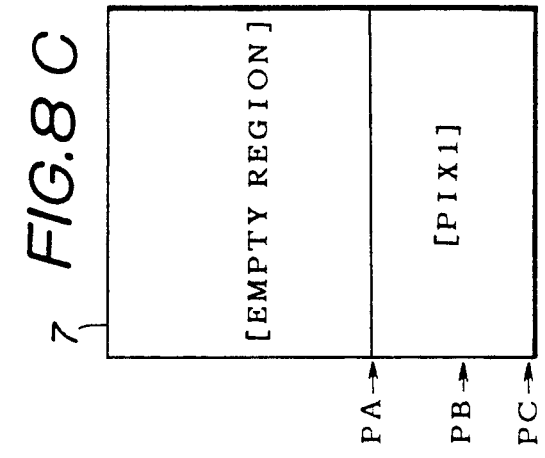
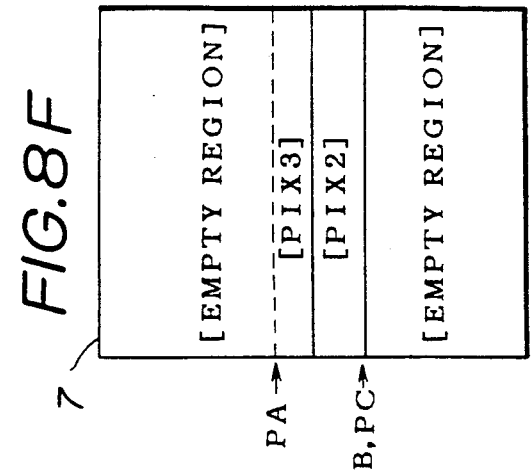
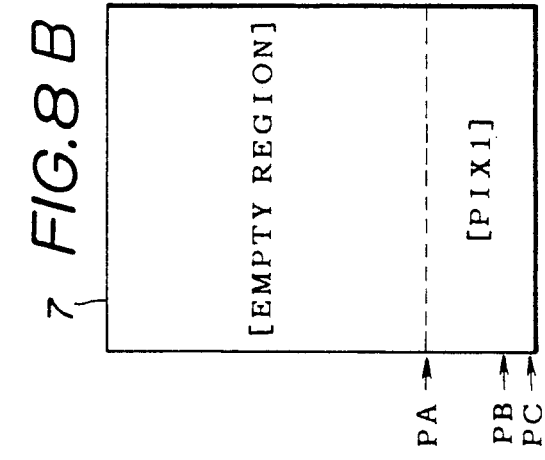
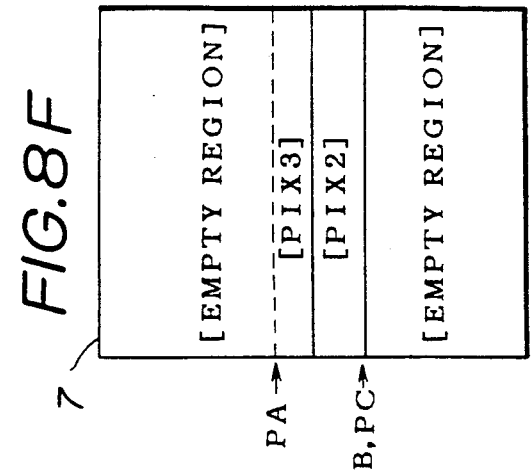
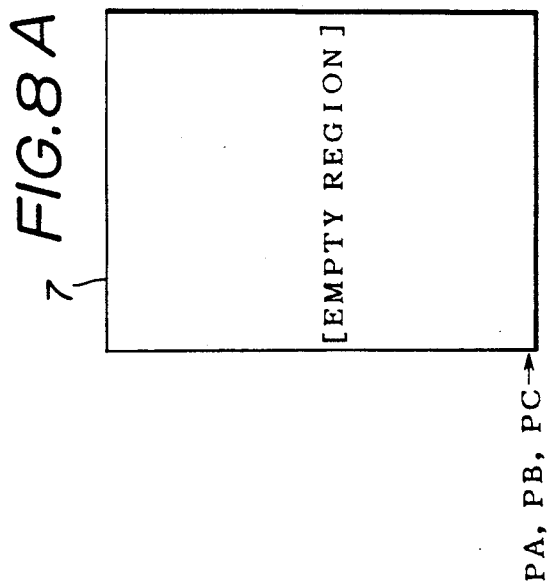
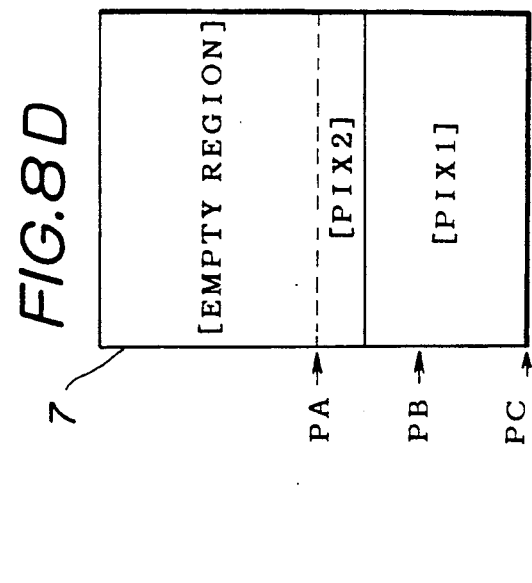

FACSIMILE MACHINE HAVING ERROR CORRECTION MODE

BACKGROUND OF THE INVENTION

The present invention generally relates to facsimile machines, and more particularly to a facsimile machine having an error correction mode.

In the present specification, a facsimile machine which sends an image information will be referred to as a source facsimile machine, and a facsimile machine which receives the image information from the source facsimile machine will be referred to as a destination facsimile machine.

When transmitting an image information from a source facsimile machine, the image information cannot be accurately reproduced on a destination facsimile machine if a transmission error exists in the received image information such as a case where the state of the line is poor due to a line noise or the like. Hence, an error correction mode (ECM) has been recommended by the CCITT as a standard system for eliminating such a problem. According to this CCITT recommendation, an image information which is coded and compressed is divided into a frame for every 256 bytes (octets) or 64 bytes from a beginning of the image information. As shown in FIG. 1A, the image information amounting to one frame is transmitted in frames FLM in conformance with a high level data link control (HDLC) procedure.

The frame FLM is made up of a (start) flag sequence F having a predetermined bit pattern, an address field A having a predetermined bit pattern (global address), a control field C having a bit pattern peculiar to the facsimile machine, an information field I, a frame check sequence FCS for making an error detection, and a (end) flag sequence F. The information field I includes a facsimile control field FCF in which a facsimile transmission procedure signal is arranged, and a facsimile information field FIF in which various information added to the facsimile transmission procedure signal is arranged.

A facsimile coding data FCD of the facsimile transmission procedure signal is arranged in the facsimile control field FCF. A frame number FNo which indicates the order (sequence) of the frames and a coded frame data FDc having a frame size FSZ are arranged in the facsimile information field FIF. Because the frame number FNo is an 8-bit binary number and only 256 consecutive numbers "0" to "255" can be described thereby, 256 consecutive frames are set to one block and the destination facsimile machine makes a retransmission request in blocks when a transmission error is detected. When the image information amounting to one page cannot be transmitted in one block, the image information related to a remaining portion of the page is transmitted in a next block.

When making the retransmission request, the destination facsimile machine sends a frame of a facsimile transmission procedure signal to the source facsimile machine. The facsimile transmission procedure signal is transmitted and received in a state including the required parameters with a frame format similar to that of a partial page request (PPR) signal, and will hereinafter simply be referred to as the PPR signal.

The PPR signal is arranged in the facsimile control field FCF of the information field I with a bit pattern which indicates that the signal is the PPR signal. On the other hand, a 256-bit error map data EMp is arranged in the facsimile information field FIF of the information field I. The error map data EMp has a data "0" or "1" for each of the frame of the received block in the order of the frames. The error map data EMp has the data "0" when no transmission error exists in the frame data of the frame and has the data "1" when a transmission error exists in the frame data of the frame. Hence, when the source facsimile machine receives the PPR signal, the source facsimile machine retransmits to the destination facsimile machine only the frame data of the frame which has the data "1" in the error map data EMp.

By repeating the retransmission request until the transmission error in all of the frames is eliminated, it becomes possible to record on a recording sheet an error-free image on the destination facsimile machine.

When receiving the image information in the ECM, the destination facsimile machine is provided with a pair of receiver buffers (memories) BF1 and BF2 which are respectively shown in FIGS. 2A and 2B. For example, the receiver buffers BF1 and BF2 respectively have a memory capacity of 64k (k=1024 bits) which is sufficient to store image information amounting to one block. The receiver buffer BF1 stores the image information of a first page. Then, the receiver buffer BF2 stores the image information of a second page, and at the same time, the image information of the first page stored in the receiver buffer BF1 is read out and recorded on the recording sheet. In other words, the recording of the image information which is already received and the reception of the image information related to a next page are carried out in parallel so as to minimize a time required to make the image information transmission from the source facsimile machine.

However, the following problems occur in the conventional facsimile machine having the ECM. That is, the information quantity of the image information related to the second page may be extremely small, and the reception of the image information related to the second page may end before the recording of the image information related to the first page ends. But in this case, it is impossible to start receiving the image information related to a third page because a memory space for storing the image information related to the third page becomes available only after the recording of the image information related to the first page ends. As a result, there is a problem in that the reception of the image information related to the third page must wait until the recording of the image information related to the first page ends. This means that the time required to transmit the image information cannot be reduced even when the information quantity of the image information related to a certain page is small if the reading out of the stored image information is not ended from the reception buffer to which the image information related to the certain page is to be stored.

SUMMARY OF THE INVENTION

Accordingly, it is a general object of the present invention to provide a novel and useful facsimile machine in which the problems described above are eliminated.

Another and more specific object of the present invention is to provide a facsimile machine having an error correction mode in conformance with CCITT recommendations comprising modem means coupled to a transmission path for modulating an image information which is transmitted to the transmission path and for demodulating an image information which is received from the transmission path, the image information being transmitted and received in blocks respectively having a predetermined format and including a predetermined number of frames of image information, a control means coupled to the modem means for controlling communications to and from the transmission path, scanning means for scanning a document image which is to be transmitted and for outputting the image information of the scanned document image as a transmitting image information, recording means for recording an image described by a received image information onto a recording sheet, memory means for temporarily storing the received image information in blocks, and processor means for controlling operations of the control means, the scanning means and the recording means. The processor means includes first and second means for carrying out a control in the error correction mode. The first means stores an image information PIXi related to an ith page in the memory means and read out and supply the image information PIXi to the recording means and simultaneously stores an image information PIX(i+1) related to a (i+1)th page. The second means enables a reception and storage of an image information PIX(i+2) related to a (i+2)th page in the memory means when an empty memory region thereof has a memory capacity greater than or equal to a predetermined memory capacity even before a read out and supply of the image information PIX(i+1) to the recording means ends. According to the facsimile machine of the present invention, it is possible to start a reception of a next page when an available empty memory region in the memory means amounts to at least a predetermined memory capacity. Hence, it is possible to effectively reduce a time it takes to transmit the image information from a source facsimile machine to a destination facsimile machine.

Other objects and further features of the present invention will be apparent from the following detailed description when read in conjunction with the accompanying drawings.

BRIEF DESCRIPTION OF THE DRAWINGS

FIGS. 8A through 8F respectively are diagrams for explaining a state of the ECM buffer during an image information reception process.

DESCRIPTION OF THE PREFERRED EMBODIMENTS

Figures 1A, 1B:
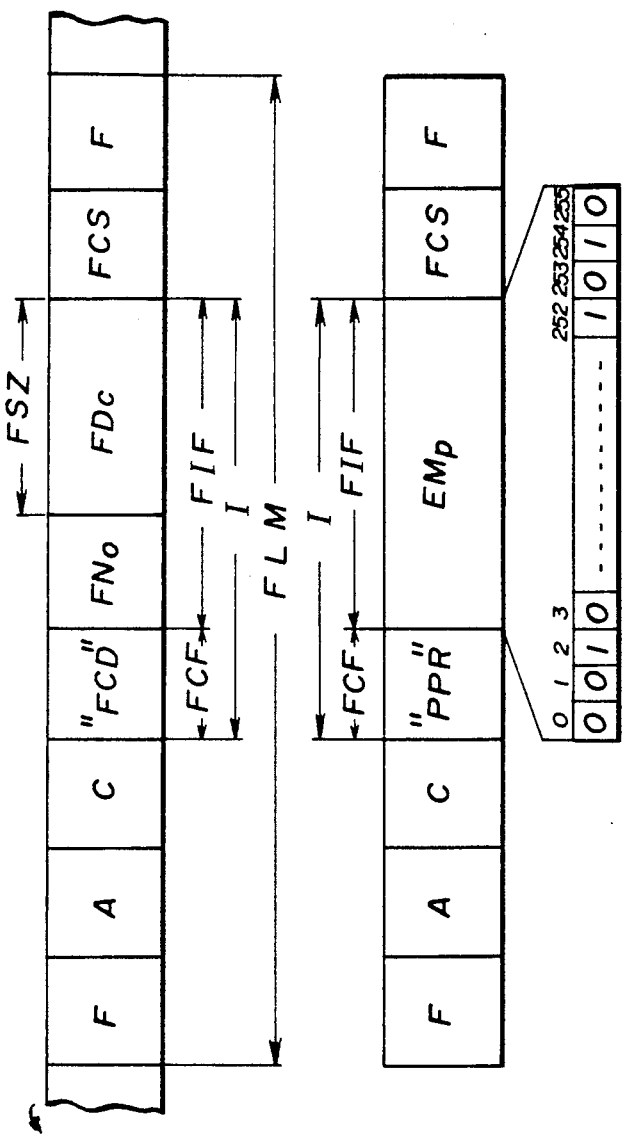
FIGS. 1A and 1B respectively are diagrams for explaining a frame of image information and a PPR signal.
Figure 2A:
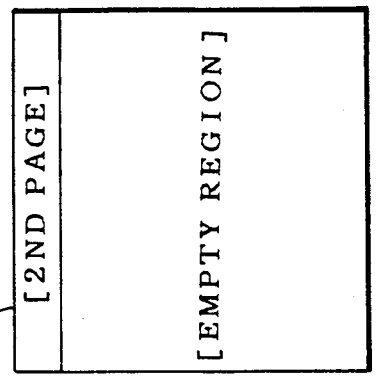
FIGS. 2A and 2B respectively show receiver buffers for storing image information received in an ECM.
Figure 2B:
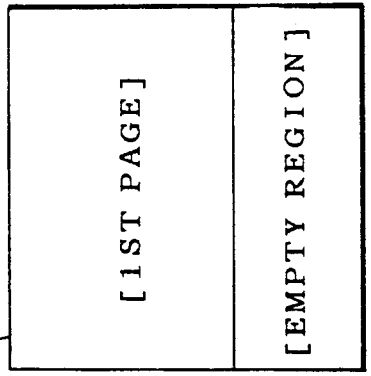
Figure 3:
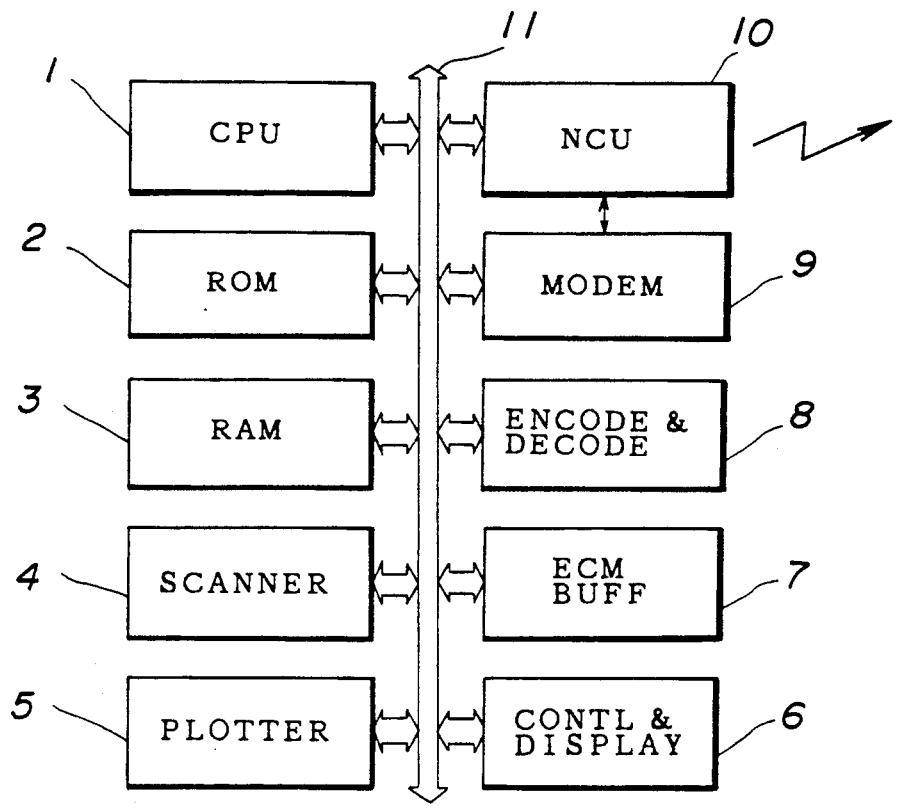
FIG. 3 is a system block diagram showing an embodiment of a facsimile machine according to the present invention.

FIG. 3 shows an embodiment of a facsimile machine according to the present invention. This facsimile machine has the ECM and comprises a central processing unit (CPU) 1, a read only memory (ROM) 2, a random access memory (RAM) 3, a scanner 4, a plotter 5, a control and display part 6, an ECM buffer (memory) 7, an encoding and decoding part 8, a modem 9, and a network control unit 10 which are coupled to each other via a system bus 11.

The CPU 1 controls the operation of each part of the facsimile machine and also carries out a predetermined facsimile transmission procedure process. The ROM 2 stores processing programs which are executed by the CPU 1 and various constants. The RAM 3 constitutes a work area of the CPU 1.

The scanner 4 reads a document image with a predetermined resolution. The plotter 5 records and outputs an image onto a recording sheet (not shown) with a predetermined resolution. The control and display part 6 includes various control keys for controlling the operation of the facsimile machine and a display for displaying various information.

The ECM buffer 7 temporarily stores the image information which is transmitted in the ECM. In this embodiment, the ECM buffer 7 has a memory capacity (128 bytes) sufficient for storing two blocks of image information.

The encoding and decoding part 8 encodes and compresses the image information which is to be transmitted, and decodes and expands the image information which is received back into the original image information.

The modem 9 carries out a modulation process for transmitting digital data via an analog transmission line and a demodulation process for demodulating the received data back into the digital data. The network control unit 10 couples the facsimile machine to a public telephone line network. This network control unit 10 has automatic calling and automatic answering functions.

Figure 4:
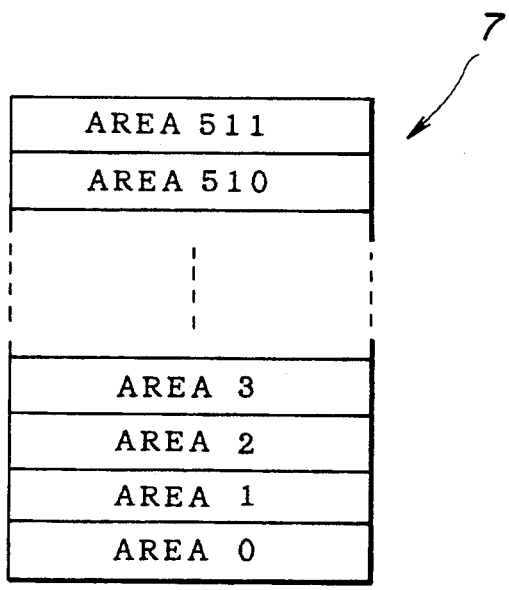
FIG. 4 shows memory areas of an ECM buffer of the facsimile machine shown in FIG. 3.

FIG. 4 shows memory areas of the ECM buffer 7. The ECM buffer 7 has 512 memory areas each having a memory capacity for storing image information amounting to one frame. The storage of the image information in the ECM buffer 7 is managed in units of the memory areas. The ECM buffer 7 is used as a so-called circulating buffer.

When receiving the image information, the facsimile machine carries out in parallel a transmission control procedure process, an image information reception process and a received image recording process.

Figure 5:
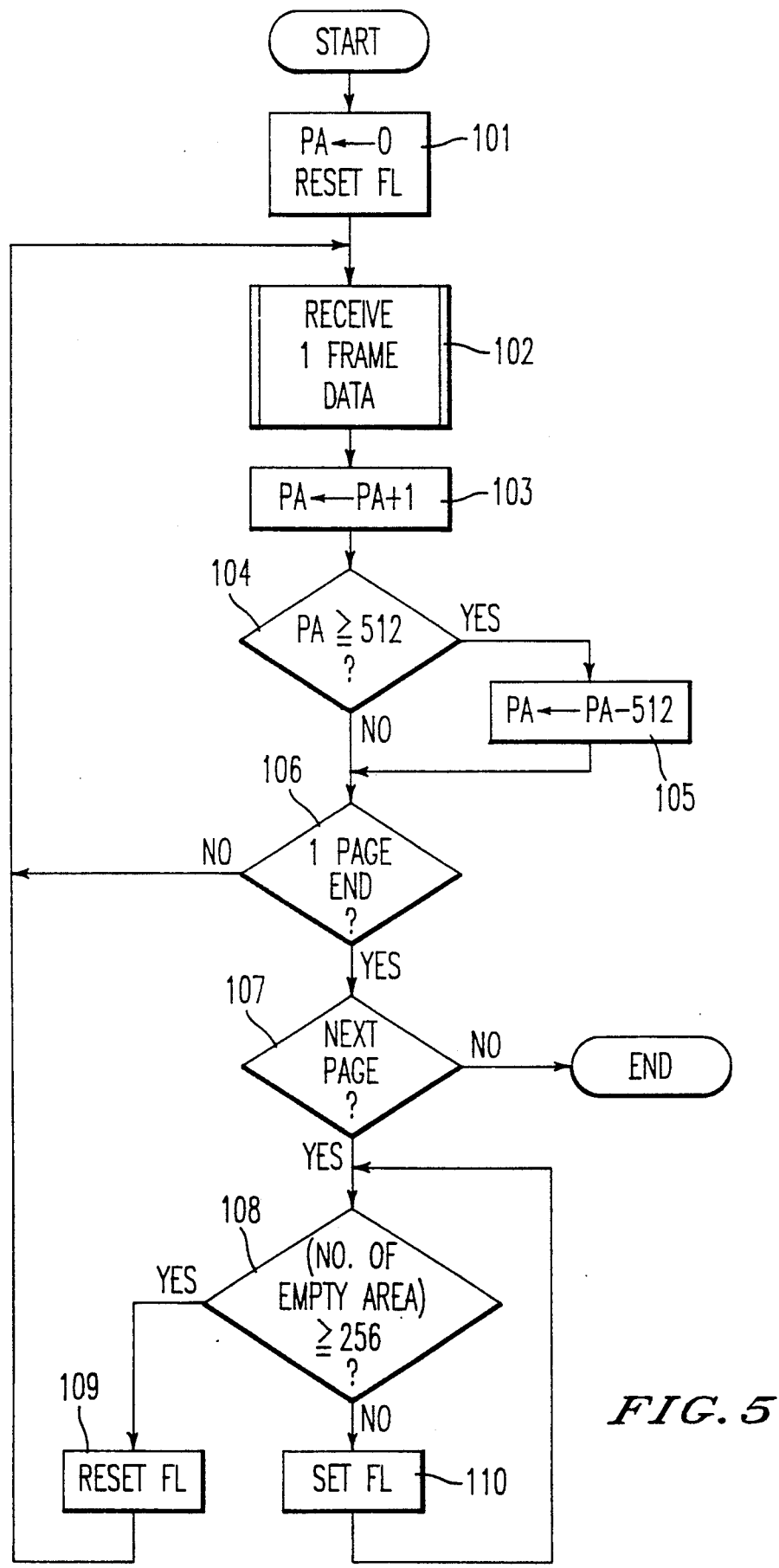
FIG. 5 is a flow chart showing an embodiment of an image information reception process of a CPU shown in FIG. 4.

FIG. 5 shows an embodiment of the image information reception process of the CPU 1. When the reception process starts, a step 101 sets "0" to a pointer PA which indicates a memory region of the ECM buffer 7 in the units of the memory areas and resets a flow control flag FL which is used for instructing the transmission control procedure process to wait for the image information reception. A step 102 receives and stores image information amounting to one frame (that is, one frame data) into a memory area of the ECM buffer 7 indicated by the pointer PA, and a step 103 increments the pointer PA by "1". A step 104 discriminates whether or not the pointer PA is greater than or equal to "512". When the discrimination result in the step 104 is YES, a step 105 subtracts "512" from the pointer PA. Hence, the value of the pointer PA is incremented up to "511" and is next returned to "0", thereby enabling the use of the ECM buffer 7 as a circulating buffer.

When the discrimination result in the step 104 is NO or after the step 105, the process advances to a step 106. The step 106 discriminates whether or not the receipt of the image information amounting to one page is ended. When the discrimination result in the step 106 is NO, the process returns to the step 102 to receive the next frame data. On the other hand, when the discrimination result in the step 106 is YES, a step 107 discriminates whether or not there is an image information related to the next page which is to be received. The reception process is ended when the discrimination result in the step 107 is NO.

When the discrimination result in the step 107 is YES, a step 108 discriminates whether or not there are 256 or more empty (available) memory areas in the ECM buffer 7. When the discrimination result in the step 108 is YES, the empty memory areas in the ECM buffer 7 are sufficient for storing one or more blocks of image information and a step 109 resets the flow control flag FL. The process returns to the step 102 after the step 109 so as to receive the image information related to the next page.

On the other hand, when the discrimination result in the step 108 is NO, the empty memory areas in the ECM buffer 7 are not sufficient for storing one or more blocks of image information, and a step 110 sets the flow control information. The process returns to the step 108 after the step 110. In other words, the flow control flag FL is set until the discrimination result in the step 108 becomes YES, and the reception of the image information related to the next page by the transmission procedure process is put on hold (wait) until the discrimination result in the step 108 becomes YES.

For example, the discrimination result in the step 108 becomes NO when the receipt of the image information related to a certain page is ended but the recording process with respect to a previous page immediately preceding the certain page is not yet ended. In this case, the memory areas of the ECM buffer 7 which store the image information related to the previous page become free when the recording process with respect to the previous page ends, and the discrimination result in the step 108 becomes YES.

Because the image information is received in the ECM, the step 102 includes a discrimination of a data error in the received image information, a retransmission request process and the like.

Figure 6:
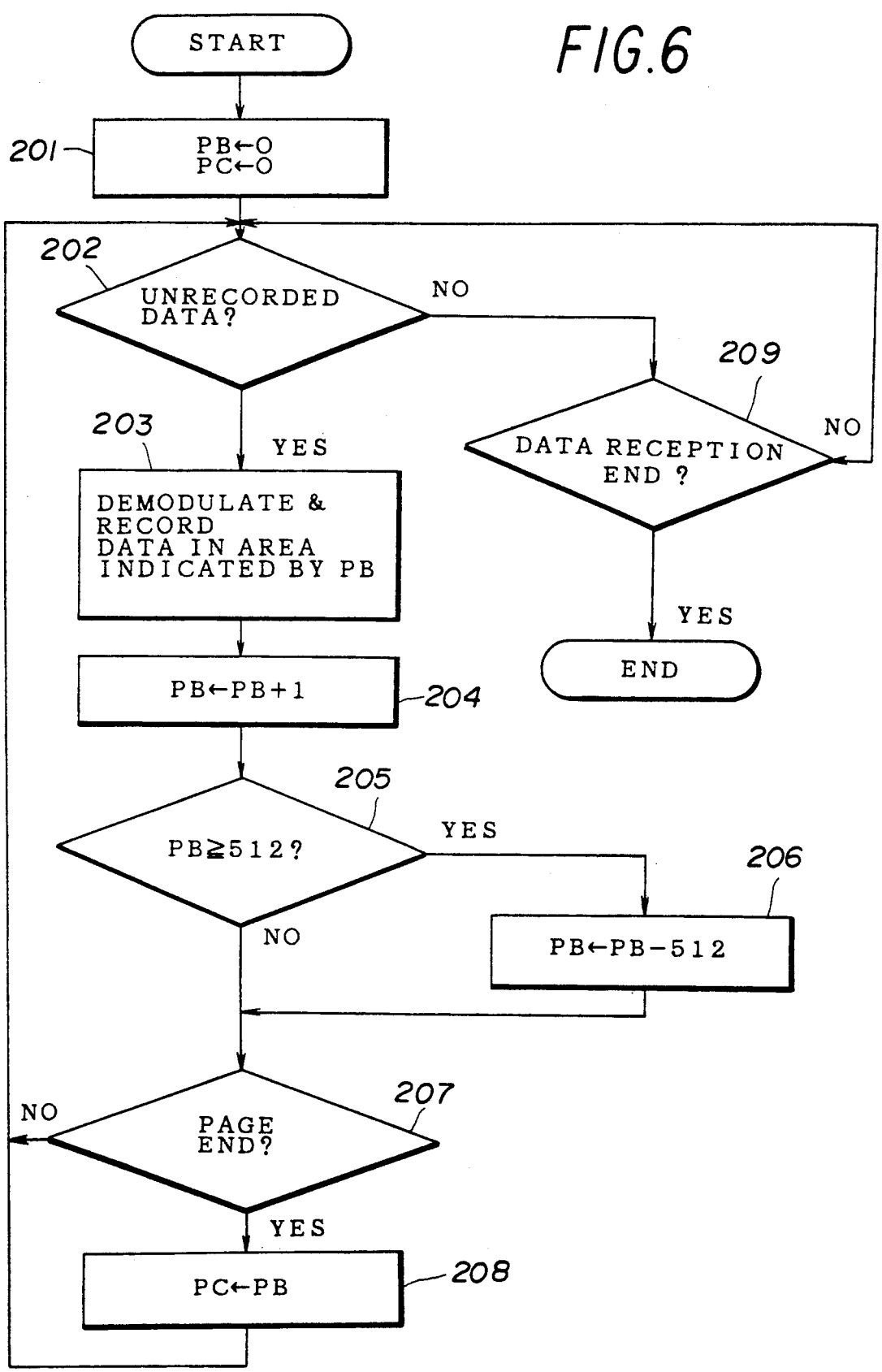
FIG. 6 is a flow chart showing an embodiment of a received image recording process of the CPU shown in FIG. 4.

FIG. 6 shows an embodiment of the received image recording process of the CPU 1. When the recording process starts, a step 201 clears pointers PB and PC to "0". The pointer PB indicates a memory area of the ECM buffer 7 wherein the image information to be demodulated is stored. The pointer PC indicates a starting memory area of the ECM buffer 7 wherein the image information of a page which is presently being recorded is stored. A step 202 discriminates whether or not the ECM buffer 7 stores an image information which is not yet recorded by the plotter 5. When the discrimination result in the step 202 is YES, a step 203 obtains the image information stored in the memory area which is indicated by the pointer PB and demodulates this image information in the encoding and decoding part 8. In addition, the step 203 supplies the demodulated image information to the plotter 5 to record the received image. Then, a step 204 increments the pointer PB by "1". A step 205 discriminates whether or not the pointer PB is greater than or equal to "512". When the discrimination result in the step 205 is YES, a step 206 subtracts "512" from the pointer PB. Hence, the value of the pointer PB is incremented up to "511" and is next returned to "0".

When the discrimination result in the step 205 is NO or after the step 206, the process advances to a step 207. The step 207 discriminates whether or not the recording of one page of image information is ended. When the discrimination result in the step 207 is NO, the process returns to the step 202 to record the remaining portion of the page. On the other hand, when the discrimination result in the step 207 is YES, a step 208 substitutes the value of the pointer PB into the pointer PC and the process returns to the step 202.

When the discrimination result in the step 202 is NO, a step 209 discriminates whether or not the image information reception process is ended. The process returns to the step 202 when the discrimination result in the step 209 is NO. The recording process is ended when the discrimination result in the step 209 is YES.

Next, a description will be given of the operation of the facsimile machine when receiving the image information in the ECM. For the sake of convenience, it is assumed that a source facsimile machine TX transmits three or more pages of image information.

Figure 7:
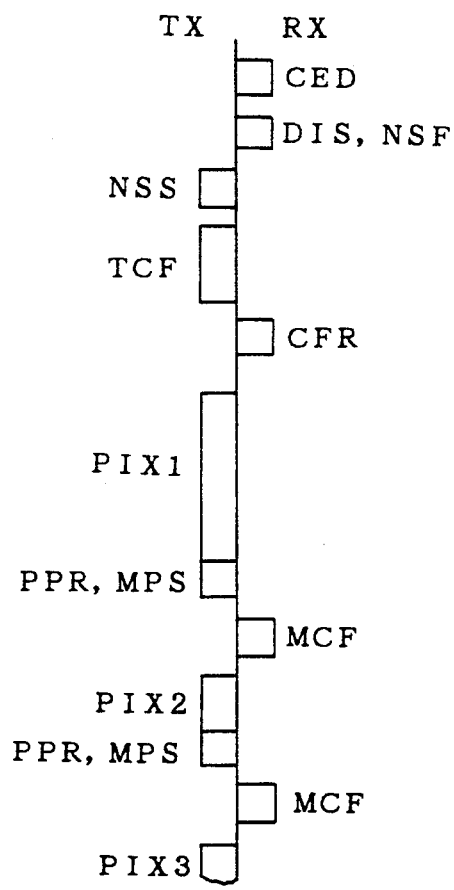
FIG. 7 is a time chart for explaining a transmission procedure.

As shown in FIG. 7, a destination facsimile machine RX sends signals CED, DIS and NSF to the source facsimile machine TX when called out from the source facsimile machine TX. The signal CED is a called station identification signal which indicates that the terminal is a non-audio terminal. The signal DIS is a digital identification signal which informs the functions of the terminal. The signal NSF is a non-standard facilities signal. These signals CED, DIS and NSF are generated in the modem 9.

Hence, the source facsimile machine TX sends to the destination facsimile machine RX a non-standard facilities set-up signal NSS for designating the ECM and the terminal function to be used and a modem training signal TCF. These signals NSS and TCF are generated in the modem 9.

When the result of the training is satisfactory, the destination facsimile machine RX responds to the source facsimile machine TX by sending a reception confirmation signal CFR and prepares for the image information reception.

Accordingly, the source facsimile machine TX transmits an image information PIXI which has the frame structure described before and is related to a first page. When the transmission of the image information PIXI ends, the source facsimile machine TX sends procedure signals PPR and MPS.

On the other hand, at the start of the reception process, the destination facsimile machine RX initializes the pointers PA, PB and PC to indicate a memory area "0" of the ECM buffer 7 as shown in FIG. 8A. When the destination facsimile machine RX receives the image information PIX1 amounting to one frame from the source facsimile machine TX, the destination facsimile machine RX stores the received image information PIX1 in the memory area of the ECM buffer 7 indicated by the pointer PA and successively increments the pointer PA.

When the image information PIX1 amounting to one or more frames is received, the destination facsimile machine RX successively reads out the received frame data from the memory area "0" to record a corresponding image on the plotter 5 while incrementing the pointer PB.

FIG. 8B shows the states of the pointers PA, PB and PC during a process of receiving the image information PIX1 related to the first page.

FIG. 8C shows the states of the pointers PA, PB and PC when the reception of the image information PIX1 related to the first page ends. In this case, when the reception of the image information PIX1 related to the first page ends, the image recording process is advanced to approximately ½ of the image information PIX1.

The destination facsimile machine RX responds by a message confirmation signal MCF when the result of the reception of the image information PIX1 is satisfactory.

Hence, the source facsimile machine TX transmits an image information PIX2 which has the frame structure described before and is related to a second page. When the transmission of the image information PIX2 ends, the source facsimile machine TX sends procedure signals PPR and MPS indicating that there is a next page to be transmitted.

When the destination facsimile machine RX receives the image information PIX2 amounting to one frame from the source facsimile machine TX, the destination facsimile machine RX stores the received image information PIX2 in the memory area of the ECM buffer 7 indicated by the pointer PA and successively increments the pointer PA, similarly to the case described above when receiving the image information PIX1 amounting to one frame.

In parallel to the reception of the image information PIX2, the destination facsimile machine RX successively reads out the frame data of the remaining portion of the image information PIX1 from the ECM buffer 7 to record a corresponding image on the plotter 5 while incrementing the pointer PB.

FIG. 8D shows the states of the pointers PA, PB and PC during a process of receiving the image information PIX2 related to the second page.

FIG. 8E shows the states of the pointers PA, PB and PC when the reception of the image information PIX2 related to the second page ends. In this case, the number of frames of the image information PIX2 related to the second page is small, and for this reason, the reception of the image information PIX2 ends before the recording process with respect to the image information PIX1 ends.

In this case, the empty memory region in the ECM buffer 7 amounts to one or more blocks at a time when the reception of the image information PIX2 ends. Thus, the destination facsimile machine RX ends the reception of the image information PIX2 and responds by a message confirmation signal MCF when procedure signals PPS and MPS are received, so as to receive an image information related to a next page. Accordingly, the source facsimile machine TX transmits to the destination facsimile machine RX an image information PIX3 which is related to a third page.

When the recording process with respect to the image information PIX1 ends at a certain time during the reception of the image information PIX3, the value of the pointer PC is renewed at this certain time to the value of the pointer PB as shown in FIG. 8F. Therefore, the memory region of the ECM buffer 7 where the image information PIX1 was stored becomes an empty memory region and the total empty memory region of the ECM buffer 7 increases.

Even when the information quantity of the image information PIX2 related to the second page is small and the reception of the image information PIX2 ends before the recording process with respect to the image information PIX1 related to the first page ends, the reception of the image information PIX3 related to the third page is enabled without delay if the empty memory region of the ECM buffer 7 amounts to one or more blocks (256 frames or more) at the time when the reception of the image information PIX2 ends. As a result, it is possible to effectively reduce the time required to transmit the image information.

In this embodiment, when the number of frames (information quantity) of the image information PIX2 related to the second page is large, it is impossible to reserve in the ECM buffer 7 an empty memory region which amounts to one or more blocks. Hence, the flow control in this case is similar to that of the conventional facsimile machine.

In order to completely eliminate the flow control, it is necessary to provide an additional memory capacity amounting to one or more blocks. This additional memory capacity may be realized by a memory device independent of the ECM buffer 7 or by use of an ECM buffer having a large memory capacity amounting to three or more blocks. In this case, an empty memory region amounting to one or more blocks can be reserved by storing the image information PIX1 which is related to the first page in the additional memory region at a time when the reception of the image information PIX1 ends, and no flow control is required in this case.

In the described embodiment, the ECM buffer 7 has a memory capacity amounting to two blocks. However, as may be understood from the above description, the memory capacity of the ECM buffer 7 may be more than two blocks.

In addition, the embodiment is described by assuming that the image information amounting to one page can be transmitted in one block. But it is of course possible to apply the present invention to a case where the image information amounting to one page is transmitted in two more blocks.

Next, a description will be given of a modification of the above described embodiment. Even when the information quantity of the image information PIX2 related to the second page is small and the reception of the image information PIX2 ends before the recording process with respect to the image information PIX1 related to the first page ends, this modification enables the reception of the image information PIX3 related to the third page without delay if the empty memory region of the ECM buffer 7 amounts to a predetermined memory capacity at the time when the reception of the image information PIX2 ends. For example, the predetermined memory capacity amounts to approximately 16 kbytes which is normally sufficient to store one page of document image on a paper having A4 size. Even if the predetermined memory capacity is insufficient to store all the image information PIX3 related to the third page, the empty memory region in the ECM buffer 7 is increased by the time the predetermined memory capacity is used up. Accordingly, it is also possible to effectively reduce the time required to transmit the image information.

Further, the present invention is not limited to these embodiments, but various variations and modifications may be made without departing from the scope of the present invention.

What is claimed is:

1. A facsimile machine having an error correction mode comprising:
   modem means coupled to a transmission path for modulating an image information which is transmitted to the transmission path and for demodulating an image information which is received from the transmission path, said image information being transmitted and received in blocks respectively having a predetermined format and including a predetermined number of frames of image information;
   control means coupled to said modem means for controlling communications to and from the transmission path;
   scanning means for scanning a document image which is to be transmitted and for outputting the image information of the scanned document image as a transmitting image information;
   recording means for recording an image described by a received image information onto a recording sheet;
   memory means for temporarily storing the received image information in blocks; and
   processor means for controlling operations of said control means, said scanning means and said recording means,
   said processor means including first and second means for carrying out a control in the error correction mode, said first means storing an image information PIXi related to an ith page in said memory means and reading out and supplying the image information PIXi to said recording means and simultaneously storing an image information PIX(i +1) related to a (i+1)th page, said second means enabling a reception and storage of an image information (PIX(i+2) related to a (i+2)th page in said memory means when an empty memory region thereof has a memory capacity greater than or equal to one block even before a read out and supply of the image information PIX(i+1) to said recording means ends, when the empty memory region is less than one block a standby state continues until the empty memory region becomes greater than or equal to one block;
   said processor means further including reception process control means for controlling a reception process in the error correction mode, said reception process control means including means for initially resetting a pointer PA which indicates a memory area of said memory means where a frame of the received image information is to be stored, means for successively incrementing the pointer PA until a value of the pointer PA reaches a predetermined value, and means for resetting the value of the pointer PA when the value exceeds the predetermined value;
   said process means further including recording process control means for controlling a recording process in the error correction mode in parallel to the reception process, said recording process control means including means for initially resetting pointers PB and PC which respectively indicate a memory area of said memory means where an image information to be demodulated is stored and a starting memory area of said memory means wherein an image information of a page of the document image which is presently being recorded is stored, means for successively incrementing the pointer PB, means for resetting the value of the pointer PB when the value exceeds a predetermined value, and means for substituting a value of the pointer PB into the pointer PC when a recording of a page of the document image ends.

2. The facsimile machine as claimed in claim 1 wherein said memory means has a memory capacity amounting to at least two blocks of image information.

3. The facsimile machine as claimed in claim 2 wherein said predetermined memory capacity amounts to at least one block of image information.

4. The facsimile machine as claimed in claim 1 wherein said transmitting image data and said received image data are transmitted and received in frames with a data format of a high level data link control (HDLC).

5. The facsimile machine as claimed in claim 4 wherein a number of bytes set in one high level data link control (HDLC) frame is selected from a group including 256 bytes or 64 bytes.

6. The facsimile machine as claimed in claim 1 wherein said transmitting image data and said received image data are respectively transmitted and received in blocks made up of a predetermined number of frames, each of the blocks corresponding to a maximum of one page of the document image.

7. The facsimile machine as claimed in claim 1 wherein said predetermined value is selected in correspondence with the predetermined number of frames constituting one block of image information.

* * * * *